United States Patent
Yadav (10) Patent No.: US 11,737,193 B2
(45) Date of Patent: Aug. 22, 2023

(54) SYSTEM AND METHOD FOR ADAPTIVE FUSION OF DATA FROM MULTIPLE SENSORS USING CONTEXT-SWITCHING ALGORITHM

(71) Applicant: SIGNIFY HOLDING B.V., Eindhoven (NL)

(72) Inventor: Daksha Yadav, Cambridge, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 295 days.

(21) Appl. No.: 17/121,860

(22) Filed: Dec. 15, 2020

(65) Prior Publication Data

US 2021/0201091 A1    Jul. 1, 2021

Related U.S. Application Data

(60) Provisional application No. 62/954,528, filed on Dec. 29, 2019.

(30) Foreign Application Priority Data

Jan. 21, 2020  (EP) .................................. 20152857

(51) Int. Cl.
| | |
|---|---|
| *H05B 47/115* | (2020.01) |
| *H05B 47/105* | (2020.01) |
| *H05B 47/165* | (2020.01) |
| *G06N 20/00* | (2019.01) |
| *G06F 18/25* | (2023.01) |
| *G06V 10/80* | (2022.01) |
| *G06V 10/70* | (2022.01) |
| *G06V 10/98* | (2022.01) |

(52) U.S. Cl.
CPC ......... *H05B 47/115* (2020.01); *G06F 18/256* (2023.01); *G06N 20/00* (2019.01); *G06V 10/811* (2022.01); *G06V 10/87* (2022.01); *G06V 10/993* (2022.01); *H05B 47/105* (2020.01)

(58) Field of Classification Search
CPC ..... G06K 9/6293; G06N 20/00; H05B 47/105
See application file for complete search history.

(56) References Cited

U.S. PATENT DOCUMENTS

| | | | |
|---|---|---|---|
| 9,006,996 B2 * | 4/2015 | Mohan ................ | H05B 47/105 315/307 |
| 2019/0050973 A1 | 2/2019 | Bernal et al. | |

(Continued)

*Primary Examiner* — Henry Luong (57) ABSTRACT

The present disclosure is directed to systems and method for adaptive fusion of sensor data from multiple sensors. The method comprises: collecting sensor data generated by a plurality of sensors in an environment; determining the quality of the sensor data generated by each sensor of the plurality of sensors, the quality metric corresponding to a suitability of the sensor data for performing a given task; selecting, via an assessment artificial intelligence program, one or more sensors from the plurality of sensors based on the determined quality metric of the sensor data that yields a desired accuracy for performing the given task; and selecting for each sensor of the plurality of sensors selected, via the assessment artificial intelligence program, a machine learning algorithm from a predetermined set of machine learning algorithms based on the determined quality metric of the sensor data that yields the desired accuracy for performing the given task.

9 Claims, 4 Drawing Sheets

(56) References Cited

U.S. PATENT DOCUMENTS

2019/0082518 A1* 3/2019 Dableh ................ H05B 47/195
2019/0110755 A1   4/2019 Capodilupo et al.
2019/0303720 A1   10/2019 Karam et al.
2019/0324431 A1   10/2019 Cella et al.
2020/0100342 A1* 3/2020 Senescu ............... H05B 47/175

* cited by examiner

SYSTEM AND METHOD FOR ADAPTIVE FUSION OF DATA FROM MULTIPLE SENSORS USING CONTEXT-SWITCHING ALGORITHM

CROSS-REFERENCE TO RELATED APPLICATIONS

This patent application claims the priority benefit of U.S. Application Ser. No. 62/954,528, filed Dec. 29, 2019 and European Application Serial No. 20152857.7, filed Jan. 21, 2020, the contents of which are herein incorporated by reference.

FIELD OF THE INVENTION

The present disclosure is directed to systems and methods for the adaptive fusion of data from multiple sensors using a context-switching algorithm.

BACKGROUND

Current Internet of Things (IoT) smart systems can utilize a sensor bundle, including multiple sensors, to accomplish various tasks, such as counting the number of occupants in a room. The benefit of deploying multiple sensors for a specific task is that if a single sensor is used for that task, there may be degraded performance when the data generated from that single sensor is of low quality due to issues such as noise, malfunction, etc. Thus, using multiple sensors offers reliability and robustness which in turn leads to an increase in performance.

Approaches for combining data from multiple sensors can be grouped into various categories such as data-level fusion (i.e., raw data from the different sensors is combined immediately after its acquisition), feature-level fusion (i.e., relevant features/information from respective sensors is extracted and the information is then combined), and decision-level fusion (i.e., algorithms at the decision level are combined to yield a single decision). However, these approaches are static in nature, meaning that the type of fusion framework is pre-determined and fixed in all settings. Existing techniques for combining data from multiple sensors primarily involves applying a fixed fusion scheme to the data generated from the multiple sources. This fixed fusion scheme may comprise applying addition, majority rule, weighing, etc. on the different streams. Thus, there is a continued need in the art for systems and methods to combine data from multiple sensors.

US 2019/324431 A1 discloses monitoring systems for data collection in an industrial environment. A system can include a data collector and a data acquisition circuit to interpret a plurality of detection values corresponding to input channels, wherein the data acquisition circuit acquires sensor data from a first route of input channels. A data storage stores sensor specifications for sensors and a data analysis circuit evaluates the sensor data with respect to the stored anticipated state information including an alarm threshold level. The data analysis circuit sets an alarm state when the alarm threshold level is exceeded for a first input channel and transmits the alarm state to a routing control facility. A response circuit changes the routing of the input channels to an alternate routing upon reception of a routing change indication from the routing control facility.

SUMMARY OF THE INVENTION

The present disclosure is directed to systems and methods for the adaptive fusion of data from multiple sensors using a context-switching algorithm. Context-switching refers to the switching from one sensor to another based on certain metrics such as the quality of the data generated. Context-switching also refers to switching from one machine learning algorithm to another based on the quality of data provided by the sensor. In methods of the present disclosure, the quality of the data generated from the different sensors is estimated using sensor-relevant data quality estimation techniques. Then, the system selects a specific sensor or a combination of sensors along with a corresponding machine learning algorithm to achieve enhanced performance in performing a task.

The context-switching algorithm for adaptive fusion of sensor data may be applied to Internet of Things (IoT) lighting systems. The IoT lighting system may comprise luminaires arranged to illuminate a room. Multiple sensors (for example, image sensors, sound sensors, infrared sensors, etc.) may be arranged in the room to detect what is happening in the room and to provide data to accomplish a task. Given the quality of the data that each sensor is generating, the context-switching algorithm can be utilized to determine which of the multiple sensors to use. Additionally, the context-switching algorithm can be utilized to determine which machine learning algorithm from a predetermined set of machine learning algorithms to use to accomplish a task, also based on the quality of the sensor data.

Generally, in one aspect, a method for adaptive fusion of sensor data from multiple sensors is provided. The method comprises: collecting sensor data generated by a plurality of sensors in an environment; determining a quality metric of the sensor data generated by each sensor of the plurality of sensors, the quality metric corresponding to a suitability of the sensor data for performing a given task; selecting, via an assessment artificial intelligence program, one or more sensors from the plurality of sensors based on the determined quality metric of the sensor data that yields a desired accuracy for performing the given task; and selecting for each sensor of the plurality of sensors selected, via the assessment artificial intelligence program, a machine learning algorithm from a predetermined set of machine learning algorithms based on the determined quality metric of the sensor data that yields the desired accuracy for performing the given task.

In an aspect, the method further comprises: receiving a classification output from each selected machine learning algorithm for each selected sensor, wherein the classification output is a result generated by performing the task; and combining classification outputs using a decision-level fusion rule.

In an aspect, the predetermined set of machine learning algorithms comprises preselected machine learning algorithms, wherein the preselected machine learning algorithms are selected by evaluating their performance in performing the given task using a benchmark data set.

In an aspect, the plurality of sensors include at least one of a PIR sensor, a thermopile sensor, a microwave sensor, an image sensor, and a sound sensor.

In an aspect, based on the combination of classification outputs from the selected machine learning algorithm for each selected sensor, a characteristic of a light emitted by one or more tunable luminaires arranged to illuminate the environment may be adjusted.

Generally, in one aspect, a computer program product for adaptive fusion of sensor data from multiple sensors having a plurality of non-transitory computer readable instructions is provided. The plurality of non-transitory computer readable instructions arranged to be stored and executed on a memory and a processor. The plurality of non-transitory computer readable instructions are operative to cause the processor to: collect sensor data generated by a plurality of sensors in an environment; determine a quality metric of the sensor data, using a data quality module 26, generated by each sensor of the plurality of sensors, the quality metric corresponding to a suitability of the sensor data for accomplishing a given task; select, via an assessment artificial intelligence program, one or more sensors from the plurality of sensors based on the determined quality metric of the sensor data that yields a desired accuracy of accomplishing the given task; and select for each sensor of the plurality of sensors selected, via the assessment artificial intelligence program, a machine learning algorithm from a predetermined set of machine learning algorithms, based on the determined quality metric of the sensor data, that yields the desired accuracy for accomplishing the given task.

In an aspect, the processor is further configured to: receive a classification output from each selected machine learning algorithm for each selected sensor, wherein the classification output is a result generated by accomplishing the task; and combine classification outputs using a decision-level fusion rule.

In an aspect, the predetermined set of machine learning algorithms comprises preselected machine learning algorithms, wherein the preselected machine learning algorithms are selected by evaluating their performance accomplishing the given task using a benchmark data set.

In an aspect, based on the combination of classification outputs from the selected machine learning algorithm for each selected sensor, a characteristic of a light emitted by one or more tunable luminaires arranged to illuminate the environment may be adjusted.

In an aspect, the assessment artificial intelligence program is selected from an artificial neural network or a support vector machine.

Generally, in one aspect, a system for adaptive fusion of sensor data from multiple sensors is provided. The system comprises: one or more tunable luminaires arranged to illuminate an environment; a controller having a processor. The processor is arranged to: collect sensor data generated by a plurality of sensors in an environment; determine a quality metric of the sensor data generated by each sensor of the plurality of sensors, the quality metric corresponding to a suitability of the sensor data for executing a given task; select, via an assessment artificial intelligence program, one or more sensors from the plurality of sensors based on the determined quality metric of the sensor data that yields a desired accuracy for executing the given task; and select for each sensor of the plurality of sensors selected, via the assessment artificial intelligence program, a machine learning algorithm from a predetermined set of machine learning algorithms based on the determined quality metric of the sensor data that yields the desired accuracy for executing the given task.

In an aspect, the processor is further configured to: receive a classification output from each selected machine learning algorithm for each selected sensor, wherein the classification output is a result generated by executing the task; and combine classification outputs using a decision-level fusion rule.

In an aspect, the predetermined set of machine learning algorithms comprises preselected machine learning algorithms, wherein the preselected machine learning algorithms are selected by evaluating their performance for executing the given task using a benchmark data set.

In an aspect, the plurality of sensors include at least one of a PIR sensor, a thermopile sensor, a microwave sensor, an image sensor, and a sound sensor.

In an aspect, the assessment artificial intelligence program is selected from a support vector machine and an artificial neural network.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

The present disclosure is directed to systems and methods for the adaptive fusion of data from multiple sensors using a context-switching algorithm. The disclosed systems and methods estimate the quality of the data generated from the different sensors using sensor-relevant data quality estimation techniques. The systems and methods then select a specific sensor or a combination of sensors along with the corresponding machine learning algorithm to achieve enhanced performance for a given task.

The context-switching algorithm disclosed herein may be applied to Internet of Things (IoT) lighting systems. The IoT lighting system may comprise luminaires arranged to illuminate a room. Multiple sensors (for example, image sensors, sound sensors, infrared sensors, etc.) may be arranged in the room to detect what is happening in the room. The context-switching algorithm can be utilized to determine which of the multiple sensors to use given the quality of the data that each sensor is generating. Additionally, the context-switching algorithm, described below as an assessment artificial intelligence program, can make determinations about which machine learning algorithm from a predetermined set of machine learning algorithms to use to accomplish a task, also based on the quality of the sensor data provided. For each of the multiple sensors, sensor data and a quality metric which describes quality of the sensor data is inputted into the assessment artificial intelligence program. Based on the task, the context-switching algorithm will provide an intermediate output which can be one of: a determination to not use the sensor based on sensor data quality and/or a determination to use one of several available machine learning algorithms to accomplish the task.

The present disclosure has several advantages over current systems. For example, current static/pre-determined fusion strategies do not account for issues such as variation in noise or sensor malfunction which may require that specific sensor(s) be eliminated from the fusion framework. Also, the same machine learning algorithms may not be well-suited for sensors generating data having a certain data quality. Further, existing fusion techniques do not account for unexpected variations in the environment, such as if a sensor unexpectedly experiences noise, or a group of sensors becomes defective. Additionally, quality of data from sensors is not incorporated in current fusion strategies. Also, in current systems for the fusion of data from lighting IoT sensors, different metrics such as quality of the data are not incorporated to determine the fusion strategy, which may play a critical role in overall performance.

The term "luminaire" as used herein refers to an apparatus including one or more light sources of same or different types. A given luminaire may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). Also, it should be understood that light sources may be configured for a variety of applications, including, but not limited to, indication, display, and/or illumination.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "task" as used herein refers to an action or set of actions designed to achieve a particular result. In a programming or processing environment, a task may be accomplished by one or more sequences of instructions on a processor of a computer. Depending on how the computer system defines a task in its design, a task may be performed, executed, or accomplished by an entire program or subparts of a program. Examples of tasks include determining the occupancy of a room or space, determining an activity in an environment, determining a condition of one of more individuals in an environment, or any combination of these illustrative tasks.

Figure 1:
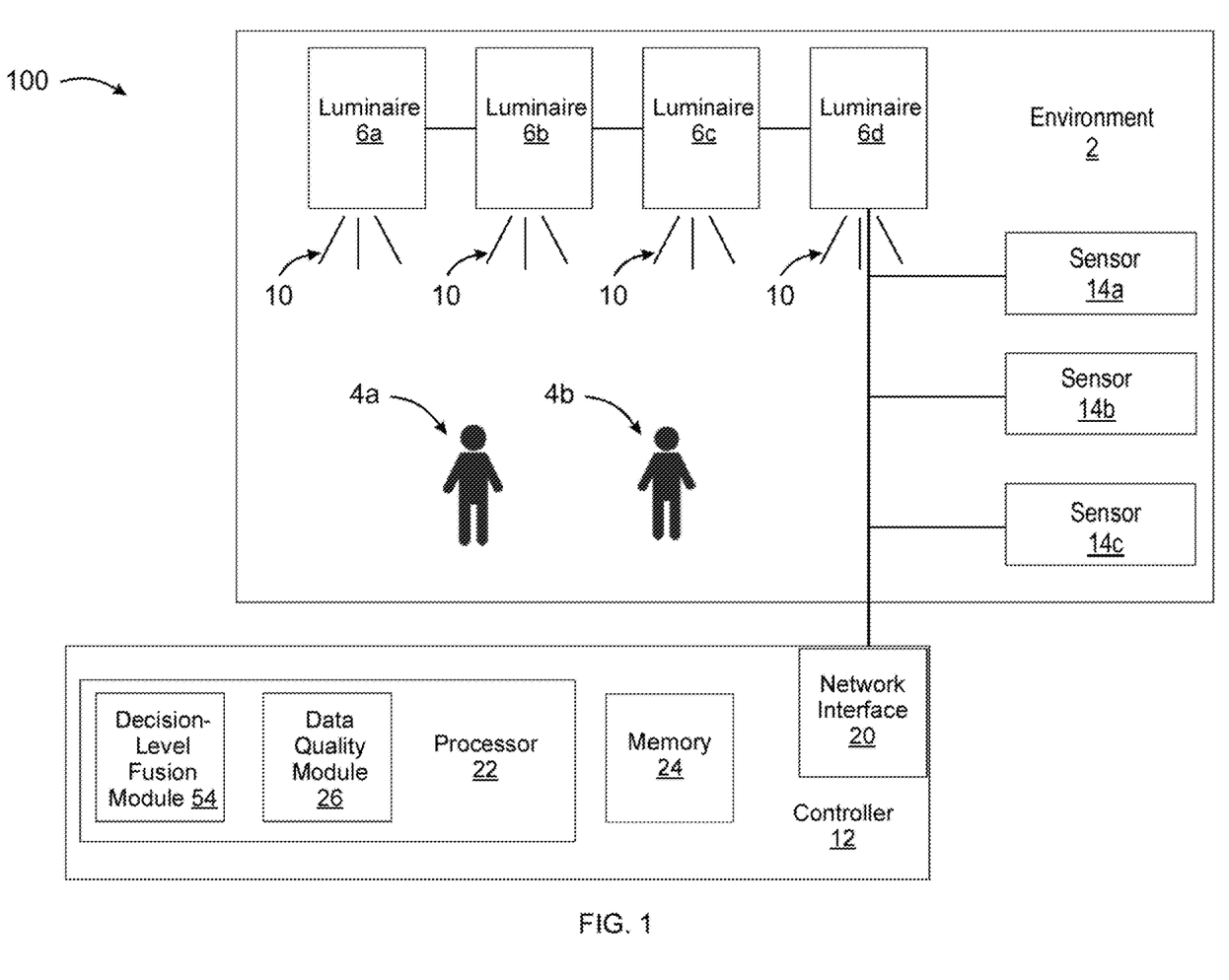
FIG. 1 is a schematic illustration of a lighting system according to aspects of the present disclosure.

FIG. 1 is a schematic illustration of lighting system 100 according to aspects of the present disclosure. Although FIG. 1 is shown as a lighting system, the systems and methods disclosed herein are not limited to use with lighting systems. Lighting system 100 includes luminaires 6a, 6b, 6c, 6d (collectively referred to as "plurality of luminaires 6") and sensors 14a, 14b, 14c (collectively referred to as "plurality of sensors 14") arranged within an environment 2 which contains people 4a, 4b. The environment 2 may be an indoor or outdoor area illuminated by a plurality of luminaires 6. The plurality of luminaires 6 are arranged to illuminate the environment and are tunable. Sensors 14a, 14b, 14c are arranged to send sensor data 18a, 18b, 18c (shown in FIG. 2) from the environment 2 to controller 12 via a network interface 20.

The plurality of luminaires 6 may be tunable so that a characteristic 8 (shown in FIG. 3) of the light 10 emitted by one or more of the luminaires 6a, 6b, 6c, 6d can be adjusted by controller 12. Communications between controller 12 and luminaires 6a, 6b, 6c, 6d can include commands sent from the controller 12 to luminaires 6a, 6b, 6c, 6d. These commands can change characteristics 8 of the luminaires 6a, 6b, 6c, 6d, for example, causing the luminaires 6a, 6b, 6c, 6d to turn on, turn off, decrease or increase in intensity, or change spectral power distribution of their illumination. Characteristic 8 of the luminaires can include: whether the luminaire is on or off, spectral power distribution, color, color temperature, light intensity, brightness, lighting power density, lighting power, illuminance, equivalence melanopic lux, light angle, or correlated color temperature.

Controller 12 uses sensor data 18a, 18b, 18c (shown in FIG. 2) to perform a task 16. For example, to determine if the task of occupancy detection has been performed, the controller 12 may be used to determine whether there is a person 4a, 4b in the environment 2 or whether there is no person 4a, 4b in the environment 2. As another example, to determine if the task of detection of an activity involving concentration has been performed, the controller 12 may be used to determine whether people 4a, 4b in the environment 2 are engaged in an activity which requires concentration. Determining whether other tasks have been performed may involve, as non-limiting examples, determining the occupancy of the environment 2, an activity performed in the environment 2, a condition of individuals 4a, 4b in the environment 2, and/or any combination of these.

Based on the output of the task, characteristics 8 of lighting in the environment 2 may be adjusted. For example, a task may involve determining that an environment 2 is occupied by people 4a, 4b. If the environment 2 is occupied, the luminaires 6a, 6b, 6c, 6d may be turned on or the light 10 from the luminaires 6a, 6b, 6c, 6d may be brightened. As another example, a task may involve determining whether people 4a, 4b in the environment 2 are engaging in a type of activity which requires particular light 10 characteristics 8, such as an activity which requires people 4a, 4b to focus for an extended time while working. In response to determining that the task has been performed, light 10 characteristics 8 of luminaires 6a, 6b, 6c, 6d which promote alertness may be set. The plurality of sensors 14 may comprise sensors 14a, 14b, 14c of one type or multiple types and are arranged to provide data to perform a set of preselected tasks. The plurality of sensors 14 may be selected from a passive infrared ("PIR") sensor, a thermopile sensor, a microwave sensor, an image sensor, a sound sensor, and/or any other sensor modality.

Figure 2:
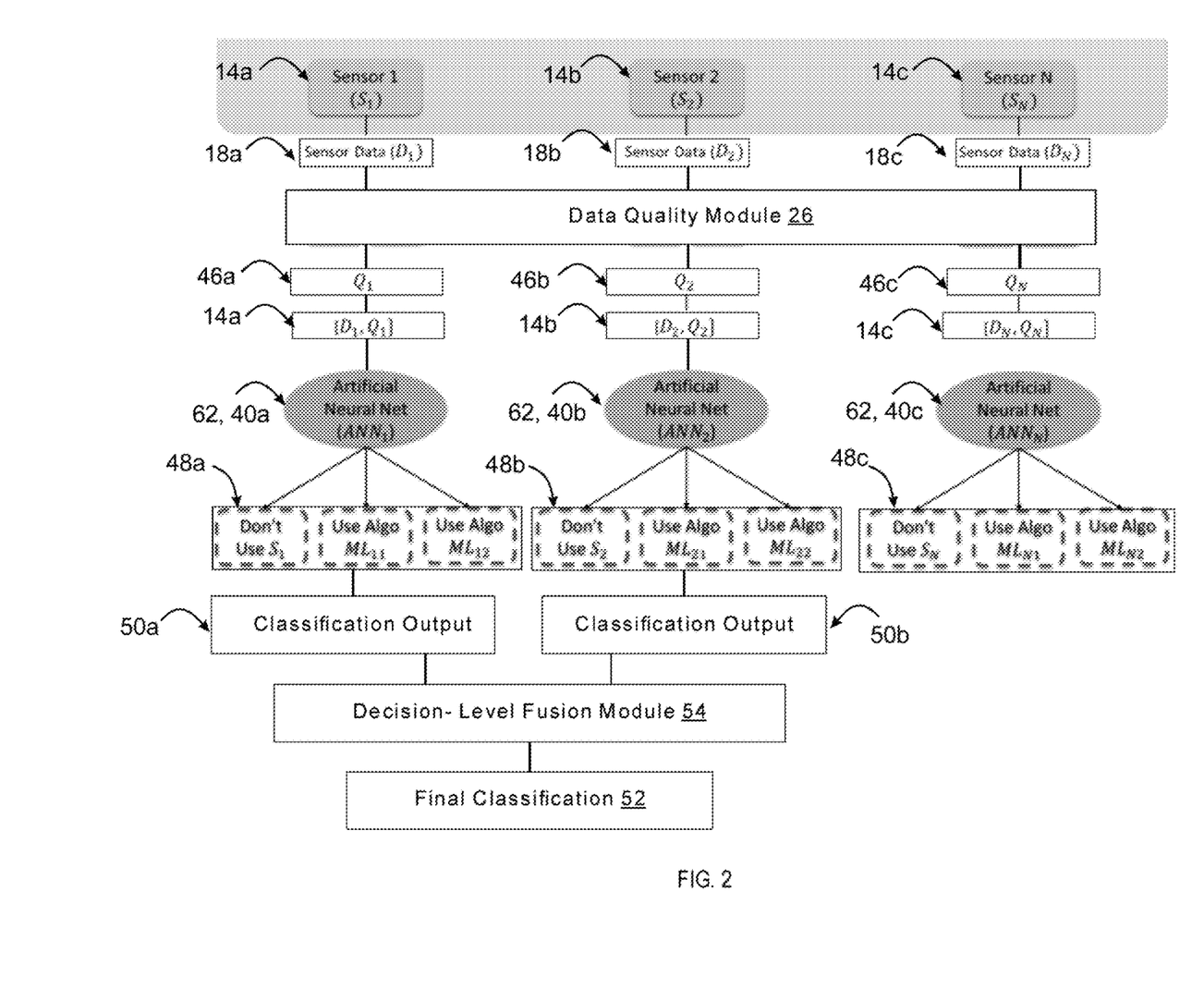
FIG. 2 is a schematic illustration of context-switching algorithm according to aspects of the present disclosure.
Figure 3:
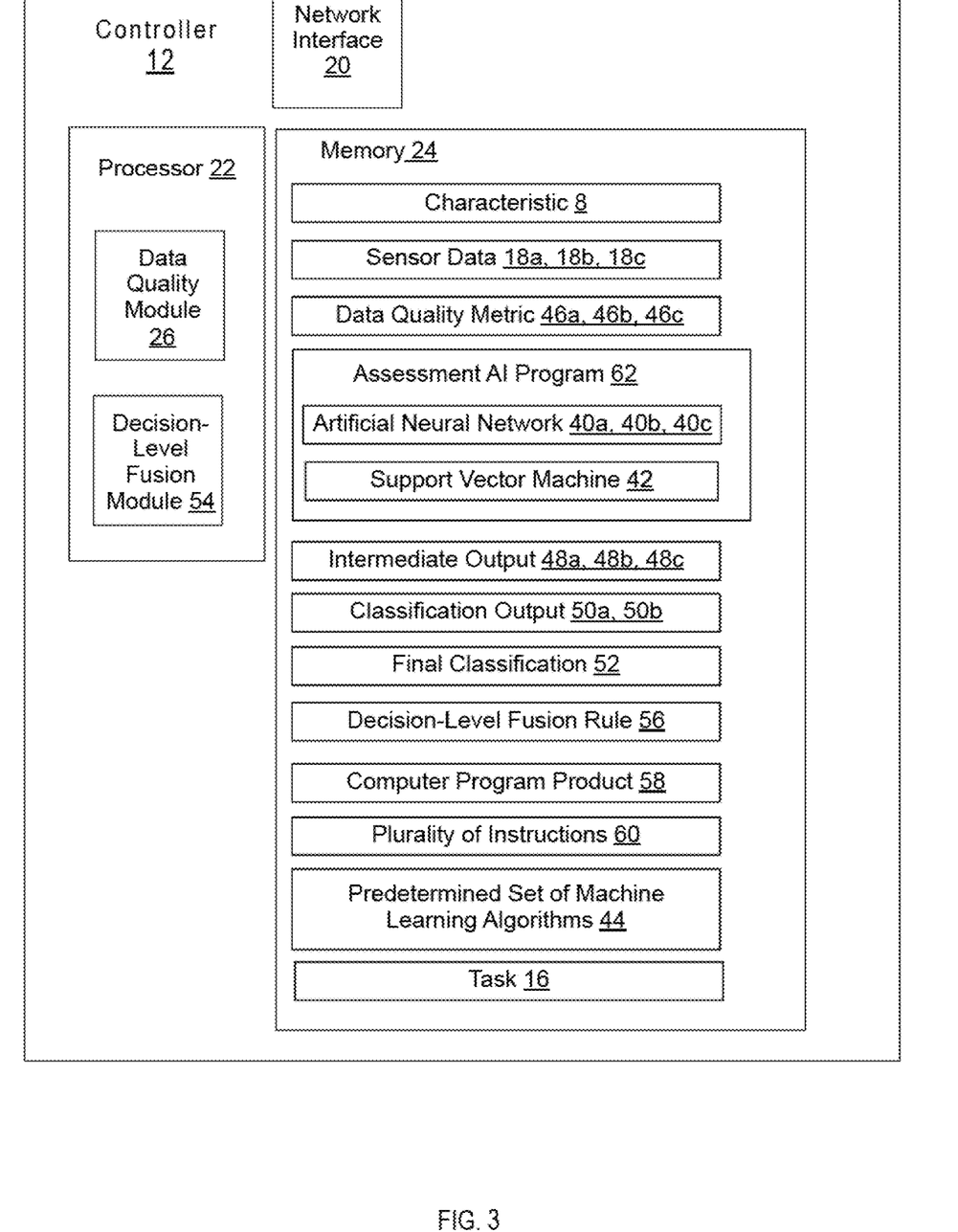
FIG. 3 is a schematic illustration of a lighting controller according to aspects of the present disclosure.

As illustrated in FIGS. 1 and 3, the controller 12 features a processor 22, a network interface 20, and memory 24. The controller 12 can be implemented in numerous ways (e.g., such as with dedicated hardware) to perform various functions discussed herein. A controller 12 that employs one or more processors 22 may be programmed using software to perform various functions discussed herein. A controller 12 may be implemented as a combination of dedicated hardware to perform some functions and a processor 22 (e.g., one or more programmed microprocessors and associated circuitry) to perform other functions. The controller 12 may be arranged to execute one or more artificial intelligence programs, such as an assessment artificial intelligence program 62, artificial neural network 40, support vector machine 42, or any machine learning algorithm 44 (shown in FIG. 2 and FIG. 3), or communicate with a remote server which runs the artificial intelligence programs (as will be described herein). It is to be understood that the controller 12 is shown schematically in FIG. 1 and may include any other components useful for controlling, monitoring, and/or otherwise assisting in the operation of the luminaires 6, including the adaptive fusion of sensor data 18a, 18b, 18c from multiple sensors 14a, 14b, 14c as described herein and in FIGS. 2, 3, and 4. The memory 24 and the processor 22 may take any suitable form known in their respective arts that is useful for controlling, monitoring, and/or otherwise assisting in the operation of the luminaires 6, including adjusting light 10 characteristics 8 of the luminaires 6a, 6b, 6c, 6d and performing other functions of the controller 12 as described herein.

A data quality module 26 in the controller 12 is arranged to determine the quality of data 18a, 18b, 18c (shown in FIG. 2) received from the sensors 14a, 14b, 14c. A decision-level fusion module 54 is arranged to apply a decision-level fusion rule 56 to combine or fuse classification outputs 50a, 50b (shown in FIG. 2) obtained using data from the sensors 14a, 14b, 14c. It should also be appreciated that although depicted as part of controller 12 in FIG. 1, the data quality module 26 and decision-level fusion module 54 may be arranged as a separable circuit, chip, or motherboard, e.g., a circuit, chip, or motherboard arranged outside of and in communication with controller 12. Where the data quality module 26 and decision-level fusion module 54 are separable from the controller 12, it should be appreciated that data quality module 26 and decision-level fusion module 54 can communicate with controller 12 via a wired or wireless connections, over a local network connection, or over a cloud based communication, for example, over the internet.

Embodiments of processor 22 include, but are not limited to, conventional microprocessors, application specific integrated circuits (ASICs), and field programmable gate arrays (FPGAs). The network interface 20 may be a wireless transceiver or any other device that enables the luminaires 6 to communicate wirelessly with each other as well as other devices utilizing the same wireless protocol standard and/or to otherwise monitor network activity and enables the controller 12 to receive sensor data 18a, 18b, 18c (shown in FIG. 2). The network interface 20 may also use wire/cable and/or fiber optic links.

The controller 12 may be associated with one or more storage media or memory 24, e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The term "program" as used herein refers in a generic sense to any type of computer code (e.g., software or microcode) that can be employed to program one or more processors or controllers.

Referring to FIG. 2, a data quality module 26 is configured to receive sensor data 18a, 18b, 18c generated by a plurality of sensors 14 in the environment 2 (shown in FIG. 1). Processor 22 (shown in FIG. 1) is arranged to operate an assessment artificial intelligence program 62, such as an artificial neural network 40, which can make determinations about which sensors 14a, 14b, 14c to use, based on the quality of the sensor data 18a, 18b, 18c, to perform a task 16 (shown in FIG. 3). Additionally, the assessment artificial intelligence program 62 can determine which machine learning algorithm from a predetermined set of machine learning algorithms 44 (shown in FIG. 3) should be used to perform the task.

As illustrated in FIG. 2, sensor data 18a, 18b, 18c generated by each sensor 14a, 14b, 14c of the plurality of sensors 14, including first sensor data 18a from the first sensor 14a, second sensor data 18b from the second sensor 14b, and third sensor data 18c from the third sensor 14c, is received by the data quality module 26. The data quality module 26 is configured to assess the quality of the sensor data 18a, 18b, 18c generated from each sensor 14a, 14b, 14c. The data quality module 26 determines the first sensor data quality metric 46a for the first sensor data 18a, determines the second sensor data quality metric 46b for the second sensor data 18b, and determines the third sensor data quality metric 46c for the third sensor data 18c. The sensor data 18a, 18b, 18c and the sensor data quality metric 46a, 46b, 46c for each sensor 14a, 14b, 14c are inputted into an assessment artificial intelligence program 62 (e.g., artificial neural network 40a, 40b, 40c) operated by processor 22.

The assessment artificial intelligence program 62 is a trained, supervised machine learning algorithm whose objective it is to learn if sensor data 18a, 18b, 18c having a determined quality metric 46a, 46b, 46c can lead to an accurate and/or satisfactory execution of a task. For example, the assessment artificial intelligence program 62 may be 2-layer artificial neural network which can be used to model complex patterns between data measurement 18a, 18b, 18c, data quality 46a, 46b, 46c, and their ability to correctly execute a task. Although illustrated as an artificial neural network 40a, 40b, 40c in FIG. 2, the assessment artificial intelligence program 62 may be a support vector machine 42 (shown in FIG. 3) or other artificial intelligence program capable of performing the functions described herein.

For each sensor 14a, 14b, 14c generating data, the artificial neural network 40a, 40b, 40c prepares an intermediate output 48a, 48b, 48c. The intermediate output 48a, 48b, 48c for each sensor 14a, 14b, 14c is one of the following: a determination not to use the sensor 14a, 14b, 14c or a determination of which machine learning algorithm to select from the predetermined set of machine learning algorithms 44. For example, as shown in FIG. 2, the artificial neural network 40a, 40b, 40c selects between a first machine learning algorithm and a second machine learning algorithm for each sensor 14a, 14b, 14c, if the determination to not use the sensor 14a, 14b, 14c has not been made. It should be appreciated that the artificial neural network 40a, 40b, 40c selects between a first machine learning algorithm and a second machine learning algorithm based on which machine learning algorithm will produce the best results and execute the task 16 (shown in FIG. 3) with greater confidence that the task was executed correctly. The determination to not use the sensor 14a, 14b, 14c is based on the quality (e.g., 46a, 46b, 46c) of the sensor data 18a, 18b, 18c for executing the task. If the artificial neural network 40a, 40b, 40c determines to use a sensor (e.g., 14a, 14b, 14c), and its sensor data (e.g., 18a, 18b, 18c), the artificial neural network 40a, 40b, 40c determines which machine learning algorithm, from a predetermined set of machine learning algorithms 44, should be used to execute the task.

The sensor data 18a, 18b, 18c from each sensor 14a, 14b, 14c of the plurality of sensors 14 may be of varying quality at a given time due to any number of conditions, such as malfunction of the sensor 14a, 14b, 14c, noise, or other conditions in the environment 2. The sensor data 18a, 18b, 18c quality metric 46a, 46b, 46c is a measure of the suitability of the sensor data 18a, 18b, 18c to execute a given task. For example, if the task is occupancy detection, a sensor quality metric 46a, 46b, 46c provides an assessment of whether the sensor data 18a, 18b, 18c (e.g., image sensor data) is sufficient to detect people in a room. Higher quality metric 46a, 46b, 46c sensor data 18a, 18b, 18c may have less noise, better resolution, and better performance executing a given task 16 than lower quality metric 46a, 46b, 46c sensor data 18a, 18b, 18c. As an example, higher quality metric 46a, 46b, 46c sensor data 18a, 18b, 18c may more often provide a correct assessment of whether people are in the room compared to lower quality metric 46a, 46b, 46c sensor data 18a, 18b, 18c. The quality metric 46a 46b, 46c of sensor data 18a, 18b, 18c is determined by data quality module 26 using techniques which may vary depending on the type of sensor 14a, 14b, 14c which is being assessed. As an example, a Wiener filter may be used to assess the quality of microphone sensor data 18a, 18b, 18c; a Kalman filter may be utilized to assess noise in PIR sensor data 18a, 18b, 18c; and the measurement of certain features, including resolution, compression, and illumination amount, may be used to assess the quality of image sensor data 18a, 18b, 18c. As a further example, the output from data quality module 26 for each sensor 14a, 14b, 14c may be normalized to a 0-1 range where the score of 1 represents data having a very high quality metric 46a, 46b, 46c and 0 represents data having a very poor quality metric 46a, 46b, 46c.

Different kinds of machine learning algorithms (e.g., machine learning algorithms in the predetermined set of machine learning algorithms 44 (shown in FIG. 3)) can be used to accomplish a task. Given the type of sensor data (e.g., 18a, 18b, 18c) and the quality of sensor data (e.g., 46a, 46b, 46c), one machine learning algorithm may be better able to accomplish a particular task than another machine learning algorithm. The ability of a particular machine learning algorithm to use sensor data 18a, 18b, 18c to accurately accomplish a task depends on many factors, including the type of sensor data 18a, 18b, 18c, the quality of sensor data 46a, 46b, 46c, and the specific task. A non-exhaustive list of exemplary machine learning algorithms which can be used to accomplish a task includes support vector machines, nearest neighbors, decision trees, Bayesian algorithms, neural networks, deep learning based algorithms, or any other known machine learning algorithms or combinations thereof. Machine learning algorithms selected to be included set of predetermine machine learning algorithms 44 may be selected based on the known performance of those algorithms in accomplishing the task. As another example, the machine learning algorithms included in the set of predetermine machine learning algorithms 44 may be selected by evaluating their performance accomplishing a given task using a benchmark data set meeting certain quality thresholds.

In the example illustrated in FIG. 2, for each sensor (e.g., 14a, 14b, 14c), the predetermined set of machine learning algorithms 44 consists of two machine learning algorithms which can be used to accomplish a particular task. The first and second machine learning algorithms of the predetermined set of machine learning algorithms 44 are selected based on their accuracy accomplishing a given task. For example, the first and second machine learning algorithms may be the two best performing machine learning algorithms at accurately detecting whether people 4a, 4b are in the environment 2, given the sensor data (e.g., 18a, 18b, 18c) and data quality (e.g., 46a, 46b, 46c) for a particular sensor (e.g., 14a, 14b, 14c). Although in the exemplary system illustrated in FIG. 2 the artificial neural network 40a, 40b, 40c selects between two machine learning algorithms to detect whether conditions in the environment 2 correspond with a task for each sensor (e.g., 14a, 14b, 14c) (if based on the sensor data (e.g., 18a, 18b, 18c) and sensor data quality (e.g., 46a, 46b, 46c) the assessment artificial intelligence program 62 determines that the sensor (e.g., 14a, 14b, 14c) should be used), it should be appreciated that the assessment artificial intelligence program 62 can select between any number of machine learning algorithms. The selection of one machine learning algorithm over other machine learning algorithms of the predetermined set of machine learning algorithms 44 (shown in FIG. 3), by the assessment artificial intelligence program 62 (shown in FIG. 3), is also based on the sensor data (e.g., 18a, 18b, 18c) and the sensor data quality (e.g., 46a, 46b, 46c). The assessment artificial intelligence program 62 selects the machine learning algorithm for which there is higher confidence that the machine learning algorithm will accurately accomplish a given task, for example, accurately detect whether there is a person 4a, 4b in an environment 2 (shown in FIG. 1).

For every sensor (e.g., 14a, 14b, 14c) of the plurality of sensors 14 which the assessment artificial intelligence program 62 determines to use, a machine learning algorithm (from the predefined set of machine learning algorithms 44 (shown in FIG. 3)) is used to provide a classification output (e.g., 50a, 50b). A classification output 50a, 50b is an output from the machine learning algorithm (e.g., 44a, 44b, 44c, 44d) for a particular sensor (e.g., 14a, 14b, 14c) and is a result generated by performing the task 16. For example, if the task if occupancy detection, a classification output 50a, 50b may be an output indicating that the environment 2 is occupied. As another example, if the task is determining the amount of ambient light in an environment 2, the classification output 50a, 50b may be a non-binary output providing information regarding ambient light. The classification output 50a, 50b may be a binary output, a non-binary output, a categorical output, and/or a numerical output. The machine learning algorithms may provide multiple classification outputs (e.g., 50a, 50b), where the number of classification outputs (e.g., 50a, 50b) is less than the number of sensors (e.g., 14a, 14b, 14c) detecting conditions in the environment 2. The multiple classification outputs (e.g., 50a, 50b) can be combined by the decision-level fusion module 54. The decision-level fusion module 54 uses a decision-level fusion rule 56 which defines how the multiple classification outputs (e.g., 50a, 50b) are aggregated to arrive at a final classification 52 to accomplish a task (for example, to determine that a room is occupied by people). For example, the decision-level fusion rule may be based on determining a majority of the classification outputs (e.g., 50a, 50b), an average of the classification outputs (e.g., 50a, 50b), a summation of the classification outputs (e.g., 50a, 50b), a minimum, a maximum, or other aggregation techniques or combinations of aggregation techniques. Once the classification outputs (e.g., 50a, 50b) are combined or fused to arrive at a final classification 52 or determination of the result generated by performing the task 16, characteristics 8 of the light 10 emitted by the luminaries 6a, 6b, 6c, 6d in the environment 2 may be adjusted by the controller 12 to set lighting conditions which are suitable for the task.

Figure 4:
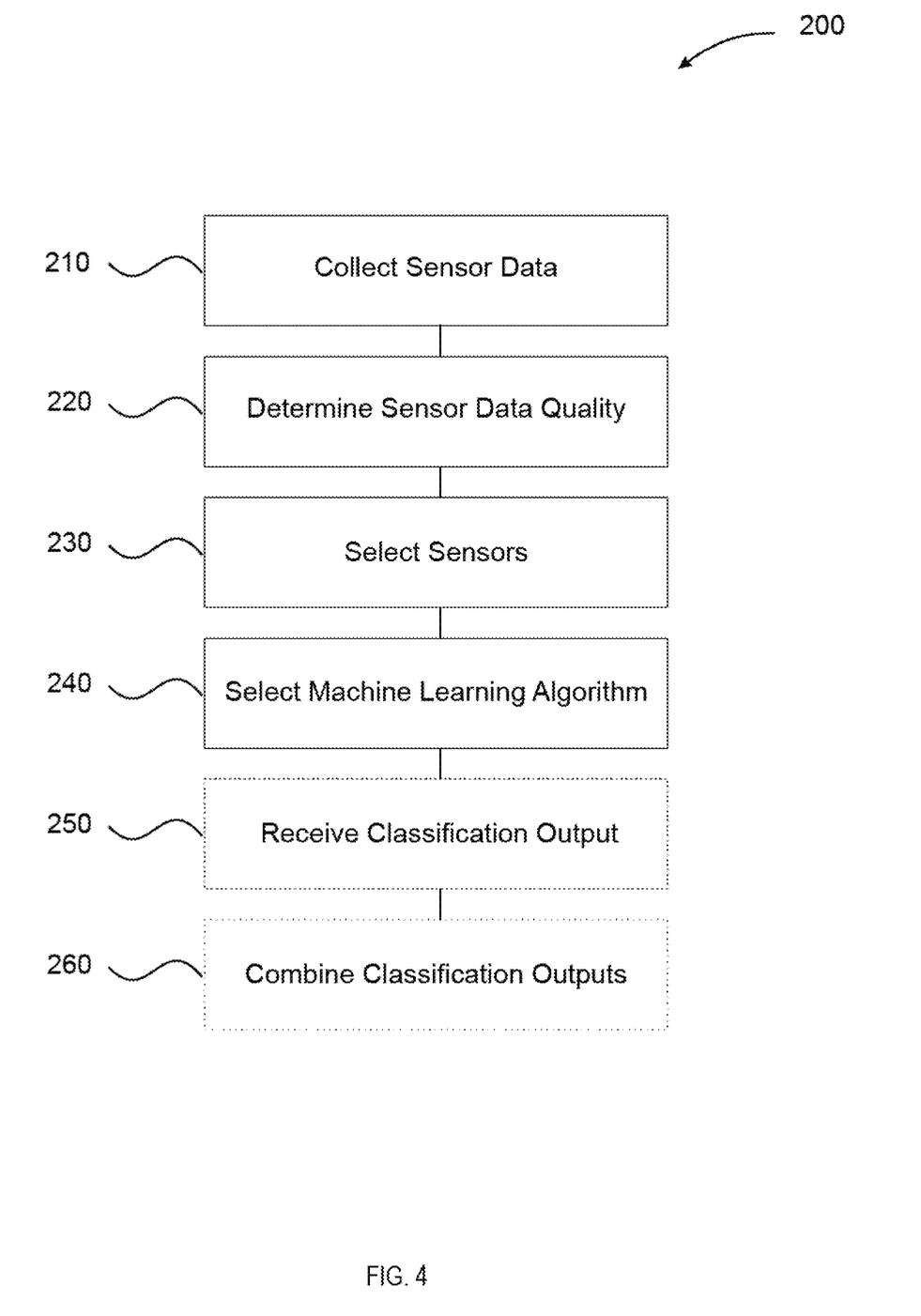
FIG. 4 is a flowchart illustrating steps of an exemplary method for the adaptive fusion of data from multiple sensors according to aspects of the present disclosure.

FIG. 4 illustrates the steps of method 200 for adaptive fusion of sensor data 18a, 18b, 18c from multiple sensors according to the present disclosure. Method 200 includes, for example, collecting sensor data 18a, 18b, 18c generated by a plurality of sensors 14a, 14b, 14c in an environment 2 (step 210); determining the quality metric 46a, 46b, 46c of the sensor data 18a, 18b, 18c generated by each sensor 14a, 14b, 14c of the plurality of sensors 14, the quality metric 46a, 46b, 46c corresponding to a suitability of the sensor data 18a, 18b, 18c for performing a given task (step 220); selecting, via an assessment artificial intelligence program 62, one or more sensors 14a, 14b, 14c from the plurality of sensors 14 based on the determined quality metric 46a, 46b, 46c of the sensor data 18a, 18b, 18c that yields a desired accuracy for performing the given task (step 230); selecting for each sensor 14a, 14b, 14c of the plurality of sensors 14 selected, via the assessment artificial intelligence program 62, a machine learning algorithm 44a, 44b, 44c, 44d from a predetermined set of machine learning algorithms 44 based on the determined quality metric 46a, 46b, 46c of the sensor data 18a, 18b, 18c that yields the desired accuracy for performing the given task 16 (step 240). Method 200 optionally includes the steps of receiving a classification output 50a, 50b from each selected machine learning algorithm 44a, 44b, 44c, 44d for each selected sensor 14a, 14b, 14c, wherein the classification output 50a, 50b is a result generated by performing the task 16 (optional step 250); and combining classification outputs 50a, 50b using a decision-level fusion rule 56 (optional step 260).

A computer program product 58 for adaptive fusion of sensor data 18a, 18b, 18c from multiple sensors 14a, 14b, 14c may also be provided. The computer program product 58 may have a plurality of non-transitory computer readable instructions 60, the plurality of non-transitory computer readable instructions 60 arranged to be stored and executed on a memory 24 and a processor 22, respectively, wherein the plurality of non-transitory computer readable instructions 60 are operative to cause the processor 22 to perform the steps of method 200.

The above-described examples of the described subject matter can be implemented in any of numerous ways. For example, some aspects may be implemented using hardware, software or a combination thereof. When any aspect is implemented at least in part in software, the software code can be executed on any suitable processor or collection of processors, whether provided in a single device or computer or distributed among multiple devices/computers.

The present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant may be entitled.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The invention claimed is:

1. A method for adaptive fusion of sensor data from multiple sensors, comprising:
   collecting the sensor data generated by a plurality of sensors in an environment;
   determining a quality metric of the sensor data generated by each sensor of the plurality of sensors, the quality metric corresponding to a suitability of the sensor data for performing a given task;
   selecting, via an assessment artificial intelligence program, one or more sensors from the plurality of sensors based on the determined quality metric of the sensor data that yields a desired accuracy for performing the given task; and
   selecting for said each sensor of the plurality of sensors selected, via the assessment artificial intelligence program, a machine learning algorithm from a predetermined set of machine learning algorithms based on the determined quality metric of the sensor data that yields the desired accuracy for performing the given task;
   receiving a classification output from each selected machine learning algorithm for each selected sensor, wherein the classification output is a result generated by performing the task; and
   combining classification outputs using a decision-level fusion rule; wherein the decision-level fusion rule defines how the classification outputs are aggregated to arrive at a final classification to accomplish the given task;
   wherein the predetermined set of machine learning algorithms comprises preselected machine algorithms, where the preselected machine learning algorithms are selected by evaluating their performance in performing the given task using a benchmark data set.

2. The method of claim 1, wherein the plurality of sensors include at least one of a PIR sensor, a thermopile sensor, a microwave sensor, an image sensor, and a sound sensor.

3. The method of claim 1, wherein based on the combination of classification outputs from the selected machine learning algorithm for each selected sensor, a characteristic of a light emitted by one or more tunable luminaires arranged to illuminate the environment may be adjusted.

4. A computer program product for adaptive fusion of sensor data from multiple sensors having a plurality of non-transitory computer readable instructions, the plurality of non-transitory computer readable instructions arranged to be stored and executed on a memory and a processor, wherein the plurality of non-transitory computer readable instructions are operative to cause the processor to:
   collect the sensor data generated by a plurality of sensors in an environment;
   determine a quality metric of the sensor data, using a data quality module, generated by each sensor of the plurality of sensors, the quality metric corresponding to a suitability of the sensor data for accomplishing a given task;
   select, via an assessment artificial intelligence program, one or more sensors from the plurality of sensors based on the determined quality metric of the sensor data that yields a desired accuracy of accomplishing the given task; and select for said each sensor of the plurality of sensors selected, via the assessment artificial intelligence program, a machine learning algorithm from a predetermined set of machine learning algorithms, based on the determined quality metric of the sensor data, that yields the desired accuracy for accomplishing the given task;
   receive a classification output from each selected machine learning algorithm for each selected sensor, wherein the classification output is a result generated by accomplishing the task; and
   combine classification outputs using a decision-level fusion rule; wherein the decision-level fusion rule defines how the classification outputs are aggregated to arrive at a final classification to accomplish the given task;
   wherein the predetermined set of machine learning algorithms comprises preselected machine learning algorithms, wherein the preselected machine learning algorithms are selected by evaluating their performance accomplishing the given task using a benchmark data set.

5. The computer program product of claim 4, wherein based on the combination of classification outputs from the selected machine learning algorithm for each selected sensor, a characteristic of a light emitted by one or more tunable luminaires arranged to illuminate the environment may be adjusted.

6. The computer program product of claim 4, wherein the assessment artificial intelligence program is selected from an artificial neural network or a support vector machine.

7. A system for adaptive fusion of sensor data from multiple sensors, the system comprising:
   one or more tunable luminaires arranged to illuminate an environment;
   a controller having a processor, the processor arranged to:
      collect the sensor data generated by a plurality of sensors in the environment;
      determine a quality metric of the sensor data generated by each sensor of the plurality of sensors, the quality metric corresponding to a suitability of the sensor data for executing a given task;
      select, via an assessment artificial intelligence program, one or more sensors from the plurality of sensors based on the determined quality metric of the sensor data that yields a desired accuracy for executing the given task; and
      select for said each sensor of the plurality of sensors selected, via the assessment artificial intelligence program, a machine learning algorithm from a predetermined set of machine learning algorithms based on the determined quality metric of the sensor data that yields the desired accuracy for executing the given task;
      receive a classification output from each selected machine learning algorithm for each selected sensor, wherein the classification output is a result generated by executing the task; and
      combine classification outputs using a decision-level fusion rule;
   wherein the decision-level fusion rule defines how the classification outputs are aggregated to arrive at a final classification to accomplish the given task;
   wherein the predetermined set of machine learning algorithms comprises preselected machine learning algorithms, wherein the preselected machine learning algorithms are selected by evaluating their performance for executing the given task using a benchmark data set.

8. The system of claim 7, wherein the plurality of sensors include at least one of a PIR sensor, a thermopile sensor, a microwave sensor, an image sensor, and a sound sensor.

9. The system of claim 7, wherein the assessment artificial intelligence program is selected from a support vector machine and an artificial neural network.

\* \* \* \* \*